United States Patent
Seong et al.

(10) Patent No.: US 11,611,246 B2
(45) Date of Patent: Mar. 21, 2023

(54) LOW FREQUENCY SENSOR BASED APPARATUS AND METHOD FOR MEASURING VEHICLE POSITION

(71) Applicants: Hyundai Motor Company, Seoul (KR); Kia Motors Corporation, Seoul (KR); Hyundai Autron Co., Ltd., Seoul (KR)

(72) Inventors: Jae Yong Seong, Gyeonggi-do (KR); Chang Woo Ha, Seoul (KR); Ki Won Ko, Gyeonggi-do (KR); Bong Ju Kim, Gyeonggi-do (KR)

(73) Assignees: Hyundai Motor Company, Seoul (KR); Kia Motors Corporation, Seoul (KR); Hyundai Autron Co., Ltd., Seoul (KR)

( * ) Notice: Subject to any disclaimer, the term of this patent is extended or adjusted under 35 U.S.C. 154(b) by 690 days.

(21) Appl. No.: 16/660,270

(22) Filed: Oct. 22, 2019

(65) Prior Publication Data
US 2020/0130529 A1 Apr. 30, 2020

(30) Foreign Application Priority Data

Oct. 25, 2018 (KR) .................. 10-2018-0128181
Sep. 11, 2019 (KR) .................. 10-2019-0113142

(51) Int. Cl.
*H02J 7/00* (2006.01)
*H02J 50/90* (2016.01)
(Continued)

(52) U.S. Cl.
CPC .............. *H02J 50/90* (2016.02); *B60L 53/12* (2019.02); *B60L 53/36* (2019.02); *B60L 53/66* (2019.02);
(Continued)

(58) Field of Classification Search
CPC .......... H02J 50/90; B60L 53/12; B60L 53/38; B60L 53/66; B60L 2240/22; B60L 2240/461; G07C 5/08
(Continued)

(56) References Cited

U.S. PATENT DOCUMENTS

| 6,992,581 B2 | 1/2006 | Reisman et al. |
| 10,029,577 B2 | 7/2018 | Widmer et al. |

(Continued)

FOREIGN PATENT DOCUMENTS

| JP | 5682965 B2 | 3/2015 |
| WO | 2015/036112 A2 | 3/2015 |

OTHER PUBLICATIONS

Sukprasert, et al., "Estimation and Control of Lateral Displacement of Electric Vehicle Using WPT Information", IEEE International Conference on Mechatronics (ICM), Apr. 2015, 329-334.

*Primary Examiner* — Zixuan Zhou
(74) *Attorney, Agent, or Firm* — Fox Rothschild LLP

(57) ABSTRACT

A method for measuring a position, is performed by a vehicle assembly (VA) for alignment between a ground assembly (GA) and the VA. The method includes transmitting low frequency (LF) signals to initiate alignment with the GA and estimating a position of a vehicle using at least one sensor mounted on the vehicle. Information regarding the estimated position of the vehicle is provided to the GA and information regarding a position of the vehicle measured by LF receive antennas of the GA and an acceleration flag calculated by the GA is received. Accordingly, a transmission strength of the LF signals transmitted by the VA is adjusted based on the information regarding the position of the vehicle measured by the LF receive antennas and the acceleration flag.

14 Claims, 8 Drawing Sheets

(51) Int. Cl.
  *B60L 53/12* (2019.01)
  *B60L 53/66* (2019.01)
  *G07C 5/08* (2006.01)
  *B60L 53/36* (2019.01)
  *G01B 7/00* (2006.01)
  *B60L 53/38* (2019.01)

(52) U.S. Cl.
  CPC .............. *G01B 7/003* (2013.01); *G07C 5/08* (2013.01); *B60L 53/38* (2019.02); *B60L 2240/22* (2013.01); *B60L 2240/461* (2013.01); *B60L 2240/62* (2013.01); *Y02T 90/12* (2013.01)

(58) Field of Classification Search
  USPC ............... 701/22; 320/108, 109; 307/104
  See application file for complete search history.

(56) References Cited

U.S. PATENT DOCUMENTS

2016/0059723 A1    3/2016  Kim et al.
2017/0361726 A1*  12/2017  Widmer .................. G01S 19/45
2018/0208073 A1    7/2018  Roehrl et al.
2018/0281610 A1*  10/2018  Saita ....................... H02J 50/90

* cited by examiner

FIG. 8

```
wheel speed = (wheel speed(fr) + wheel speed(fl) + wheel speed(rr) + wheel speed(rl))/4 distance = sample time * wheel speed
yaw rate = yaw rate + yaw rate offset if abs(yaw rate) < limit value
        heading degree = yaw rate * sample time
else
        heading degree = 0 updated yaw rate
= distance * [sin(heading degree), cos(heading degree)]

updated position = updated position + updated yaw rate
```

FIG. 9

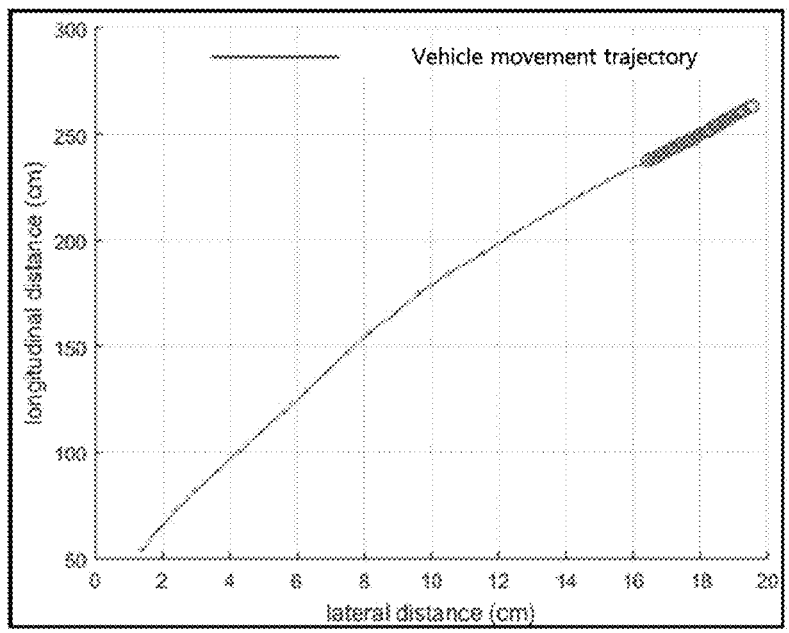

LOW FREQUENCY SENSOR BASED APPARATUS AND METHOD FOR MEASURING VEHICLE POSITION

CROSS-REFERENCES TO RELATED APPLICATIONS

The present application claims the benefit of priority to Korean Patent Applications No. 10-2018-0128181 filed on Oct. 25, 2018 and No. 10-2019-0113142 filed on Sep. 11, 2019, the entire contents of which are incorporated herein by reference.

TECHNICAL FIELD

The present disclosure relates to a method and an apparatus for measuring a vehicle position in wireless charging, and more specifically, to a method and an apparatus for measuring a vehicle position using low frequency (LF) sensors.

BACKGROUND

An electric vehicle (EV) operates an electric motor by a power of a battery, and produces less air pollution such as exhaust gas and noise compared with a conventional gasoline engine vehicle, has a long lifespan, and an advantage that the operation thereof is simplified. The EVs are classified into hybrid electric vehicles (HEVs), plug-in hybrid electric vehicles (PHEVs), and electric vehicles (EVs), depending on a driving source. The HEV has an engine as a main power and a motor as an auxiliary power. The PHEV has a main power motor and an engine used when a battery is discharged. The EV has a motor, but it does not have an engine.

The wireless charging of the battery for driving the electric motor of the EV may be performed by coupling a primary coil of a charging station with a secondary coil of the EV in a magnetic resonance manner. Additionally, in a magnetic resonance wireless power transfer (WPT) system, if the primary and secondary coils are not aligned, the efficiency of the WPT may be substantially reduced. Therefore, the alignment of the primary coils and the secondary coils is required.

As a conventional alignment scheme, a technique has been developed of aligning an EV equipped with a secondary coil to a primary coil of a ground assembly (GA) using a rear camera. Another developed technique teaches moving a movable charging pad after an EV is parked in a parking area by a bump to align a primary coil of the charging pad with a secondary coil of the EV.

However, such the conventional techniques may cause user's intervention in the alignment of the coils, inconvenience due to the user's intervention, and a substantial deviation of the alignment, which may lead to excessive system performance deterioration due to slight coil misalignment. Therefore, in the magnetic resonance wireless power transfer (WPT) system sensitive to the misalignment of the coils, it is difficult to realize the optimum power transfer efficiency, and the stability and reliability of the system may be reduced.

Accordingly, there is a need for a method of more accurately measuring or estimating the position of the vehicle for alignment between the ground assembly of charging station and the vehicle assembly of electric vehicle in the WPT system.

SUMMARY

The present disclosure provides a method for measuring a position of a vehicle using low-frequency (LF) sensors. Additionally, the present disclosure provides an apparatus for measuring a position of a vehicle using LF sensors.

According to exemplary embodiments of the present disclosure, a method for measuring a position, performed by a vehicle assembly (VA) for alignment between a ground assembly (GA) and the VA, may include: transmitting low frequency (LF) signals to initiate alignment with the GA; estimating a position of a vehicle using at least one sensor mounted on the vehicle; providing information regarding the estimated position of the vehicle to the GA; receiving information regarding a position of the vehicle measured by LF receive antennas of the GA and an acceleration flag calculated by the GA; and adjusting a transmission strength of the LF signals transmitted by the VA based on the information regarding the position of the vehicle measured by the LF receive antennas and the acceleration flag.

The adjusting of the transmission strength may further include, in response to a GA notification indicating that at least one of the LF receive antennas is saturated, reducing the transmit strength of the LF signals until a change is detected in the position of the vehicle measured by the LF receive antennas. The acceleration flag may be calculated by comparing the estimated position of the vehicle and the measured position of the vehicle. The adjusting of the transmission strength may include linearly decreasing the transmission strength of the LF signals as a distance between the VA and the GA, which is derived from the position measured by the LF receive antennas, decreases.

The linearly decreasing of the transmission strength may further include: in response to determining that the acceleration flag has a positive value, reducing the transmission strength of the LF signals in proportion to a magnitude of the acceleration flag; and in response to determining that the acceleration flag has a negative value, reducing the transmission strength of the LF signals in inverse proportion to the magnitude of the acceleration flag.

The adjusting of the transmission strength may further include determining the transmission strength of the LF signals using a default interpolation table derived by linearizing signal strengths for respective distances measured by the LF receive antennas and a position correction table derived based on the acceleration flag. The at least one sensor mounted on the vehicle may include at least one of a wheel speed sensor and a yaw rate sensor, and the estimated position of the vehicle may be calculated based on a wheel speed and a yaw rate.

Furthermore, according to exemplary embodiments of the present disclosure, a method for measuring a position, performed by a ground assembly (GA) for alignment between the GA and a vehicle assembly (VA), may include: detecting low frequency (LF) signals transmitted by the VA through LF receive antennas of the GA; calculating a position of a vehicle based on the LF signals; receiving information regarding a position of the vehicle estimated by the VA; calculating an acceleration flag by comparing the position of the vehicle calculated based on the LF signals with the position of the vehicle estimated by the VA; and transmitting information regarding the position of the vehicle calculated based on the LF signals and the acceleration flag to the VA.

The method may further include: determining whether at least one the LF receive antennas is saturated when the vehicle is positioned on a power transmission pad; and providing a notification to the VA that the at least one of the LF receive antennas is saturated. The determining of whether at least one of the LF receive antennas is saturated may further include determining that at least one of the LF receive antennas is saturated when the position of the vehicle calculated based on the LF signals does not change although the position of the vehicle estimated by the VA changes.

The transmission strength of the LF signals transmitted by the VA may decrease linearly as a distance between the VA and the GA decreases. The transmission strength of the LF signals transmitted by the VA may be adjusted using a default interpolation table derived by linearizing signal strengths for respective distances measured by the LF receive antennas and a position correction table derived based on the acceleration flag. The estimated position of the vehicle may be calculated based on a wheel speed and a yaw rate, which are sensed by at least one sensor mounted on the vehicle.

Furthermore, according to exemplary embodiments of the present disclosure, an apparatus for measuring a position of a vehicle for alignment between a ground assembly (GA) and a vehicle assembly (VA) may include at least one low frequency (LF) transmit antenna, a processor, and a memory configured to store at least one instruction executable by the processor. Additionally, the at least one instruction may be configured to: transmit LF signals to initiate alignment with the GA; estimate a position of the vehicle using at least one sensor mounted on the vehicle; provide information regarding the estimated position of the vehicle to the GA; receive information regarding a position of the vehicle measured by LF receive antennas of the GA and an acceleration flag calculated by the GA; and adjust a transmission strength of the LF signals transmitted by the VA based on the information regarding the position of the vehicle measured by the LF receive antennas and the acceleration flag.

The adjusting of the transmission strength may further include, when the GA provides a notification indicating that at least one of the LF receive antennas is saturated, reducing the transmit strength of the LF signals until a change is detected in the position of the vehicle measured by the LF receive antennas. The acceleration flag may be calculated by comparing the estimated position of the vehicle and the measured position of the vehicle. The adjusting of the transmission strength may further include linearly decreasing the transmission strength of the LF signals as a distance between the VA and the GA, which is derived from the position measured by the LF receive antennas, decreases.

The linearly decreasing of the transmission strength may further include: in response to determining that the acceleration flag has a positive value, reducing the transmission strength of the LF signals in proportion to a magnitude of the acceleration flag; and in response to determining that the acceleration flag has a negative value, reducing the transmission strength of the LF signals in inverse proportion to the magnitude of the acceleration flag.

The adjusting of the transmission strength may further include determining the transmission strength of the LF signals using a default interpolation table derived by linearizing signal strengths for respective distances measured by the LF receive antennas and a position correction table derived based on the acceleration flag. The at least one sensor mounted on the vehicle may include at least one of a wheel speed sensor and a yaw rate sensor, and the estimated position of the vehicle may be calculated based on a wheel speed and a yaw rate.

According to the exemplary embodiments of the present disclosure, by more accurately measuring the position of the vehicle using LF signals, the primary coil of the ground assembly and the secondary coil of the electric vehicle may be aligned more accurately, thereby maximizing wireless charging efficiency.

BRIEF DESCRIPTION OF DRAWINGS

The present disclosure will become more apparent by describing in detail exemplary embodiments of the present disclosure with reference to the accompanying drawings, in which:

FIG. 8 is a conceptual diagram for explaining a position estimation method according to an exemplary embodiment of the present disclosure;

FIG. 9 is a graph illustrating a movement trajectory of a vehicle according to an exemplary embodiment of the present disclosure;

Figure 1:
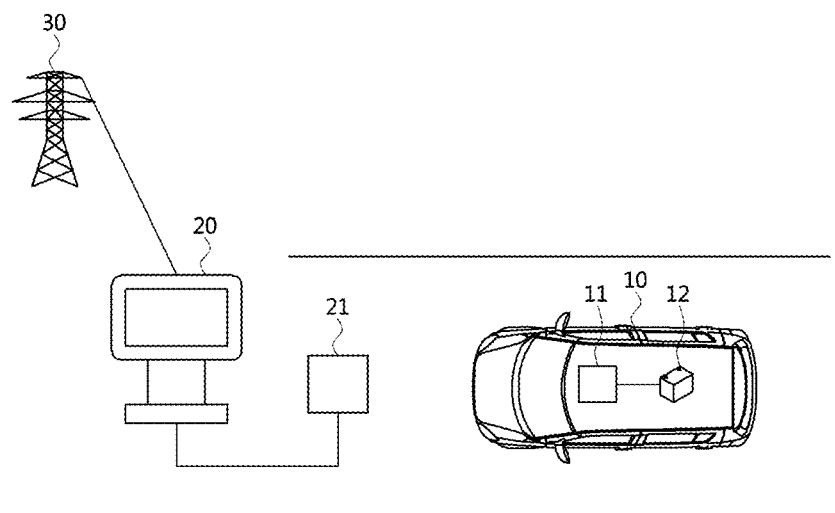
FIG. 1 is a conceptual diagram illustrating a concept of a wireless power transfer (WPT) to which exemplary embodiments of the present disclosure are applied.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure, however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" or "control unit" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four—or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the alternating current (AC) supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Additionally, the utility may provide information about certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly capable of transferring power. The automatic charging may be performed after obtaining necessary authentication and right.

"Interoperability": A state in which components of a system interwork with corresponding components of the system in order to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA. The GA may be referred to as a supply device, and the VA may be referred to as an EV device.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed in the EV. When the EV is receiving power, the EV device may transfer the power from the primary to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions may generate a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with the unique dedicated supply device, at which it is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command & control communication. The data link of the HLC may use a power line communication (PLC), but it is not limited.

"Low-power excitation (LPE)": LPE means a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc. According to exemplary embodiments of the present disclosure, "rapid charging" may refer to a method of directly converting AC power of a power system to direct current (DC) power, and supplying the converted DC power to a battery mounted on an EV. In particular, a voltage of the DC power may be DC about 500 volts (V) or less.

According to exemplary embodiments of the present disclosure, "slow charging" may refer to a method of charging a battery mounted on an EV using AC power supplied to a general home or workplace. An outlet in each home or workplace, or an outlet disposed in a charging stand may provide the AC power, and a voltage of the AC power may be AC about 220V or less. The EV may further include an on-board charger (OBC) configured to boost the AC power for the slow charging, convert the AC power to DC power, and supply the converted DC power to the battery.

According to exemplary embodiments of the present disclosure, a frequency tuning may be used for performance optimization. In particular, the frequency tuning may be performed by a supply device and may not be performed by an EV device. Additionally, it may be required for all the supply devices to provide the frequency tuning over a full range. An electric vehicle power controller (EVPC) may operate in a frequency range between about 81.38 kHz and 90.00 kHz. A nominal frequency (hereinafter, referred to as a target frequency, a design frequency, or a resonance frequency) for the magnetic field wireless power transfer (MF-WPT) may be about 85 kHz. The power supply circuits may provide the frequency tuning.

Hereinafter, exemplary embodiments of the present disclosure will be explained in detail by referring to accompanying figures.

FIG. 1 is a conceptual diagram illustrating a concept of a wireless power transfer (WPT) to which exemplary embodiments of the present disclosure are applied. As shown in FIG. 1, a WPT may be performed by at least one component of an electric vehicle (EV) 10 and a charging station 20, and may be used for wirelessly transferring power to the EV 10. The EV 10 may be usually defined as a vehicle supplying an electric power stored in a rechargeable energy storage including a battery 12 as an energy source of an electric motor which is a power train system of the EV 10.

However, the EV 10 according to exemplary embodiments of the present disclosure may include a hybrid electric vehicle (HEV) having an electric motor and an internal combustion engine together, and may include an automobile and also a motorcycle, a cart, a scooter, and an electric bicycle. Additionally, the EV 10 may include a power reception pad 11 including a reception coil for charging the battery 12 wirelessly and may include a plug connection for conductively charging the battery 12. In particular, the EV 10 configured for conductively charging the battery 12 may be referred to as a plug-in electric vehicle (PEV).

The charging station 20 may be connected to a power grid 30 or a power backbone, and may provide an alternating current (AC) power or a direct current (DC) power to a power transmission pad 21 including a transmission coil through a power link. Additionally, the charging station 20 may be configured to communicate with an infrastructure management system or an infrastructure server that manages the power grid 30 or a power network via wired/wireless communications, and perform wireless communications with the EV 10. The wireless communications may be Bluetooth, ZigBee, cellular, wireless local area network (WLAN), or the like. For example, the charging station 20 may be located at various places including a parking area attached to the a house, a parking area for charging an EV at a gas station, a parking area at a shopping center, a workplace, or the like.

A process of wirelessly charging the battery 12 of the EV 10 may begin with first disposing the power reception pad 11 of the EV 10 in an energy field generated by the power transmission pad 21, and coupling the reception coil and the transmission coil with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning. All or part of the internal components and the reception pad 11 of the EV 10 may be referred to as a vehicle assembly (VA), in which the VA may refer to the previously defined meaning. The power transmission pad or the power reception pad may be configured to be non-polarized or polarized.

When a pad is non-polarized, a first pole is disposed in a center of the pad and a second pole (e.g., an opposite pole) is disposed in an external periphery. In particular, a flux may be formed to exit from the center of the pad and return to external boundaries of the pad. When a pad is polarized, a respective pole may be disposed at either end portion of the pad. In particular, a magnetic flux may be formed based on an orientation of the pad. In the present disclosure, the transmission pad 21 or the reception pad 11 may collectively be referred to as a "wireless charging pad".

Figure 2:
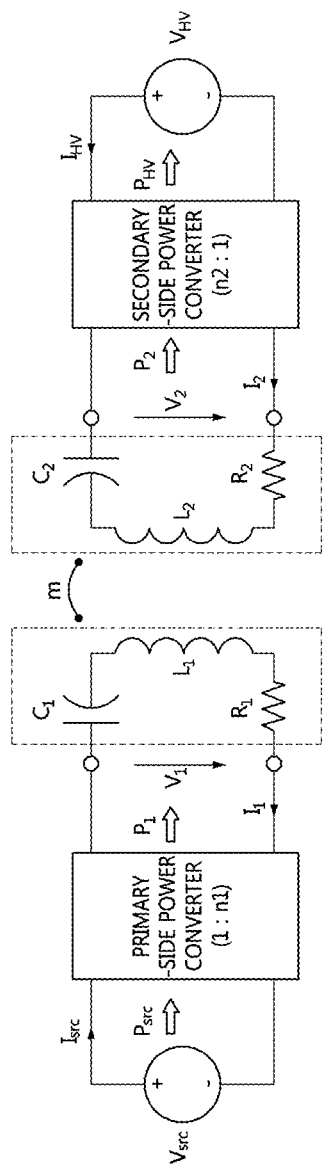
FIG. 2 is a conceptual diagram illustrating a WPT circuit according to exemplary embodiments of the present disclosure.

FIG. 2 is a conceptual diagram illustrating a WPT circuit according to exemplary embodiments of the present disclosure. As shown in FIG. 2, a schematic configuration of a circuit in which a WPT is performed in an EV WPT system is shown. The left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left-side circuit of FIG. 2 may provide an output power $P_{src}$ that corresponds to the power source $V_{src}$ supplied from the power network to a primary-side power converter. The primary-side power converter may be configured to supply an output power $P_1$ converted from the output power $P_{src}$ through frequency-converting and AC-to- DC/DC-to-AC converting to generate an electromagnetic field at a desired operating frequency in a transmission coil $L_1$.

In particular, the primary-side power converter may include an AC/DC converter configured to convert the power $P_{src}$ which is an AC power supplied from the power network into a DC power, and a low-frequency (LF) converter configured to convert the DC power into an AC power having an operating frequency suitable for wireless charging. For example, the operating frequency for wireless charging may be determined to be within about 79 to 90 kHz.

The power $P_1$ output from the primary-side power converter may be supplied again to a circuit including the transmission coil $L_1$, a first capacitor $C_1$ and a first resistor $R_1$. In particular, a capacitance of the first capacitor $C_1$ may be determined as a value having an operating frequency suitable for charging together with the transmission coil $L_1$. The first resistor $R_1$ may represent a power loss occurred by the transmission coil $L_1$ and the first capacitor $C_1$.

Further, the transmission coil $L_1$ may have electromagnetic coupling, which is defined by a coupling coefficient m, with the reception coil $L_2$ and thus, a power $P_2$ may be transmitted, or the power $P_2$ may be induced in the reception coil $L_2$. Therefore, the meaning of power transfer in the present disclosure may be used together with the meaning of power induction. Still further, the power $P_2$ induced in or transferred to the reception coil $L_2$ may be provided to a secondary-side power converter. Particularly, a capacitance of a second capacitor $C_2$ may be determined as a value having an operating frequency suitable for wireless charging together with the reception coil $L_2$, and a second resistor $R_2$ may represent a power loss occurring by the reception coil $L_2$ and the second capacitor $C_2$.

The secondary-side power converter may include an AC-to-DC converter configured to convert the supplied power $P_2$ of a specific operating frequency to a DC power having a voltage level suitable for the battery $V_{HV}$ of the EV. The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. In particular, resonance frequencies of the transmission coil $L_1$ and the reception coil $L_2$ may be similar or identical to each other, and the reception coil $L_2$ may be positioned near the electromagnetic field generated by the transmission coil $L_1$. The circuit of FIG. 2 should be understood as an illustrative circuit for WPT in the EV WPT system used for exemplary embodiments of the present disclosure, and is not limited to the circuit illustrated in FIG. 2.

Moreover, since the power loss may increase as the transmission coil $L_1$ and the reception coil $L_2$ are separated by a predetermined distance, the relative positions of the transmission coil $L_1$ and the reception coil $L_2$ may be set. The transmission coil $L_1$ may be included in the transmission pad 21 in FIG. 1, and the reception coil $L_2$ may be included in the reception pad 11 in FIG. 1. Additionally, the transmission coil may be referred to as a GA coil, and the reception coil may be referred to as a VA coil. Therefore, position alignment between the transmission pad and the reception pad or position alignment between the EV and the transmission pad will be described below with reference to the drawings.

Figure 3:
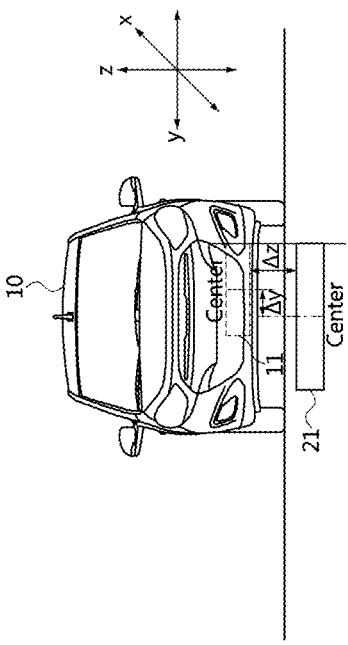
FIG. 3 is a conceptual diagram illustrating a concept of alignment in an EV WPT according to exemplary embodiments of the present disclosure.

FIG. 3 is a conceptual diagram for explaining a concept of alignment in an EV WPT according to exemplary embodiments of the present disclosure. As shown in FIG. 3, a method of aligning the power transmission pad 21 and the power reception pad 11 in the EV in FIG. 1 will be described. In particular, positional alignment may correspond to the alignment, which is the above-mentioned term, and thus may be defined as positional alignment between the GA and the VA, but is not limited to the alignment of the transmission pad and the reception pad. Although the transmission pad 21 is illustrated as positioned below a ground surface as shown in FIG. 3, the transmission pad 21 may also be positioned on the ground surface, or positioned to expose a top portion surface of the transmission pad 21 below the ground surface.

The reception pad 11 of the EV may be defined by different categories based on heights (defined in the z-direction) measured from the ground surface. For example, the categories may be defined as a class 1 for reception pads having a height of about 100-150 millimeters (mm) from the ground surface, a class 2 for reception pads having a height of about 140-210 mm, and a class 3 for reception pads having a height of about 170-250 mm. The reception pad may support a part of the above-described classes 1 to 3. For example, only the class 1 may be supported according to the type of the reception pad 11, or the class 1 and 2 may be supported according to the type of the reception pad 11. The height of the reception pad measured from the ground surface may correspond to the previously defined term "vehicle magnetic ground clearance."

Further, the position of the power transmission pad 21 in the height direction (i.e., defined in the z-direction) may be determined to be disposed between the maximum class and the minimum class supported by the power reception pad 11. For example, when the reception pad supports only the class 1 and 2, the position of the power transmission pad 21 may be determined between about 100 and 210 mm with respect to the power reception pad 11.

In addition, a gap between the center of the power transmission pad 21 and the center of the power reception pad 11 may be determined to be disposed within the limits of the horizontal and vertical directions (defined in the x- and y-directions). For example, the gap may be determined to be located within ±75 mm in the horizontal direction (defined in the (−y)-direction or in the right direction perpendicular to the vehicle direction), and within ±100 mm in the vertical direction (defined in the (−x)-direction or in a vehicle travelling direction). The relative positions of the power transmission pad 21 and the power reception pad 11 may be varied based on experimental results, and the numerical values should be understood as exemplary.

Although the alignment between the pads is described on the assumption that each of the transmission pad 21 and the reception pad 11 includes a coil, more specifically, the alignment between the pads may refer to the alignment between the transmission coil (or GA coil) and the reception coil (or VA coil) which are respectively included in the transmission pad 21 and the reception pad 11.

Meanwhile, to maximize charging efficiency during wireless charging to an EV, low-frequency (LF) signals may be used for a method of aligning a primary coil (i.e., GA coil) with a secondary coil (i.e., VA coil). Further, in the society of automotive engineers (SAE) standard meetings, considering autonomous driving technology, position alignment techniques using autonomous (or, automatic) parking or remote parking is being studied.

According to ISO 15118-8 that is an EV charging communication standard document, when wireless communication for charging an EV is used, communication between an electric vehicle communication controller (EVCC) and a supply equipment communication controller (SECC) conforms to the IEEE 802.11-2012. A required range of a distance between the EVCC and the SECC for a communication channel considered in the wireless communication is 5 m to 30 m for discovery, 10 cm to 5 m for fine positioning (fine alignment), and 5 cm to 5 m for charge control.

Particularly, the discovery is a step in which an EV searches for a charging pad, and the EVCC enters a communication region of at least one SECC and connects with an appropriate SECC. The fine positioning may refer to alignment between primary and EV devices (i.e., coils) for efficient power transfer in case of WPT, and alignment between connectors of the EV and an EVSE for power transfer in an automatic connection for conductive charging. The charge control may be in form of, for example, a power request from the EV to the EVSE.

Figure 4:
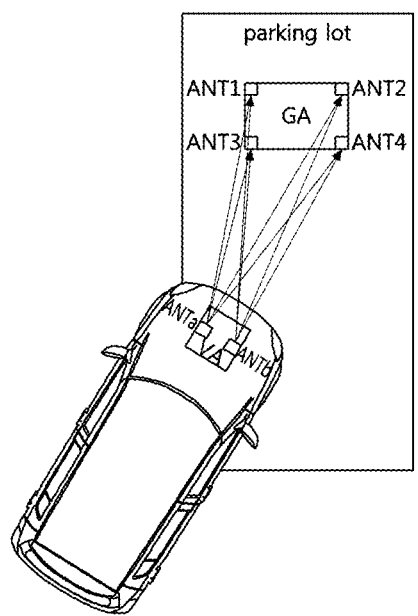
FIG. 4 is a conceptual diagram illustrating position alignment for wireless charging to which exemplary embodiments of the present disclosure are applied.

FIG. 4 is a conceptual diagram illustrating position alignment for wireless charging to which exemplary embodiments of the present disclosure are applied. As shown in FIG. 4, a position alignment method according to an exemplary embodiment of the present disclosure, which is a method for maximizing and/or optimizing the wireless charging efficiency by aligning a primary coil of a GA to a secondary coil of a VA, may be performed based on measurement of magnetic fields between four antennas ANT1, ANT2, ANT3 and ANT4 in the GA side (e.g., a first GA antenna, a second GA antenna, a third GA antenna, and a fourth GA antenna) and two antennas ANTa and ANTb in the VA side (e.g., a first VA antenna and a second VA antenna).

More specifically, the VA may include two antennas, and the two antennas may be disposed sequentially in the left and right regions of the VA. The left and right regions may refer to regions divided into two halves of the VA, and may be left and right symmetrically separated regions. When the VA has a rectangular structure, the two antennas may be disposed at the center of the left side and the center of the right side respectively of the rectangular structure, but the structure is not limited to a rectangle and may be changed according to a design selection.

Additionally, the two antennas may be disposed in a specific portion of the vehicle as connected with the VA, in which case they may be disposed sequentially in the left and right regions of the specific portion of the vehicle. The left region and the right region of the specific portion of the vehicle may refer to symmetrically separated regions in the specific portion of the vehicle. Alternatively, instead of the left and right regions of the specific portion of the VA or the vehicle, a front region and a rear region of the specific portion of the VA or the vehicle may be used, but are not limited thereto. In other words, two regions that are symmetrically separated may be generally used. Hereinafter, it will be assumed that the antennas are disposed in the VA.

The VA or a VA controller may include a position alignment apparatus configured to operate the antennas and calculate position difference information between the VA and the GA. The GA may include four antennas, and the four antennas may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size.

When the GA has a rectangular structure, the four antennas may be disposed at each corner of the rectangular structure, but the structure is not limited to a rectangle and may be changed according to a design selection. Additionally, the GA or a GA controller may also include a magnetic field detection apparatus configured to calculate magnetic field measurement values based on magnetic fields detected by the four antennas and transmit the magnetic field measurement values to the position alignment apparatus.

Herein, the antenna included in the VA and/or GA may refer to a loop antenna or may refer to a ferrite rod antenna, but is not limited thereto. The ferrite rod antenna may refer to an antenna using a low frequency (LF). The LF may refer to an LF band using a band of 30 to 300 kHz among 12 frequency ranges classified by International Telecommunication Union (ITU). Table 1 below shows the frequency ranges divided into 12 ranges in the ITU.

TABLE 1

|    | Abbreviation | Frequency range | Wave length range |
|----|--------------|-----------------|-------------------|
| 1  | ELF          | 3~30 Hz         | 100,000~10,000 km |
| 2  | SLF          | 30~300 Hz       | 10,000~1000 km    |
| 3  | ULF          | 300~3000 Hz     | 1000~100 km       |
| 4  | VLF          | 3~30 kHz        | 100~10 km         |
| 5  | LF           | 30~300 kHz      | 10~1 km           |
| 6  | MF           | 300~3000 kHz    | 1000~100 m        |
| 7  | HF           | 3~30 MHz        | 100~10 m          |
| 8  | VHF          | 30~300 MHz      | 10~1 m            |
| 9  | UHF          | 300~3000 MHz    | 1~0.1 m           |
| 10 | SHF          | 3~30 GHz        | 100~10 mm         |
| 11 | EHF          | 30~300 GHz      | 10~1 mm           |
| 12 | THF          | 300~3000 GHz    | 1~0.1 mm          |

Figure 5:
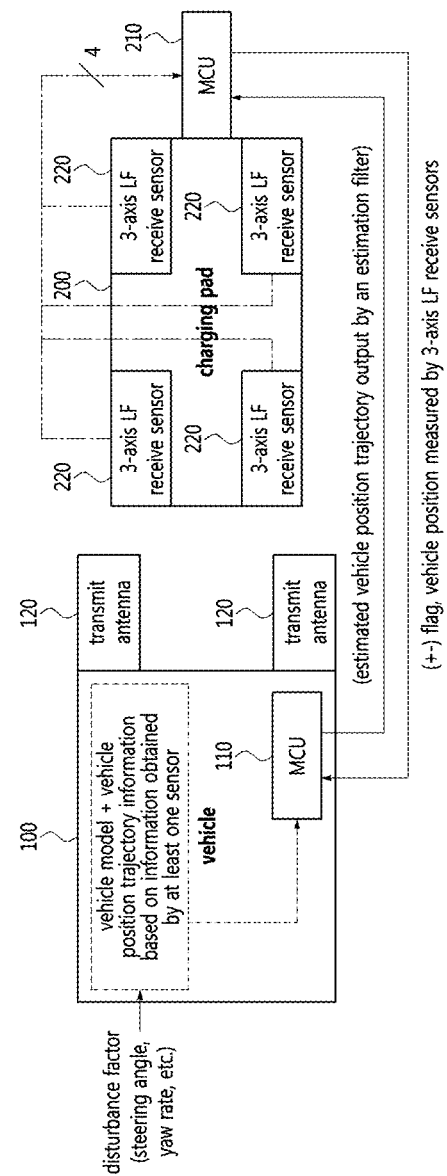
FIG. 5 is a conceptual diagram illustrating vehicle position estimation performed between a vehicle and a ground assembly according to an exemplary embodiment of the present disclosure.

FIG. 5 is a conceptual diagram illustrating vehicle position estimation performed between a vehicle and a ground assembly according to an exemplary embodiment of the present disclosure.

The present disclosure proposes a position estimation method for reducing saturation of magnetic fluxes that are linked to an LF receiving end, that is, a ferrite antenna core of a GA. The position estimation methods according to the present disclosure relate to position estimation for wireless charging performed between a VA and a GA as shown in FIG. 5.

In the present specification, for convenience of description, a vehicle, an EV, or a VA may be used in the same sense as an entity performing the position estimation on the vehicle side. Additionally, a GA, a transmission pad, and a charging pad may be used in the same sense as an entity on the power supply device side.

As shown in FIG. 5, a VA 100 according to an exemplary embodiment of the present disclosure may include a plurality of LF transmit antennas 120 and a controller 110 (or, a main control unit (MCU)). The VA 100 may also include additional components not shown in FIG. 5. Particularly, the VA 100 may include two transmit antennas, and as shown in FIG. 4, the two antennas may be disposed sequentially in the left and right regions of the VA. The left and right regions may refer to regions divided into two halves of the VA, and may be left and right symmetrically separated regions.

In addition, a transmission pad, which is a charging pad in a GA 200, may include a plurality of LF receive antennas 220 and a controller 210 (or, an MCU). Particularly, the charging pad may include four LF receive sensors (or, LF receive antennas), and the four antennas (or, sensors) may be disposed in a first region, a second region, a third region, and a fourth region of the GA, respectively, and the first, second, third, and fourth regions may refer to a upper left region, a upper right region, a lower left region, and a lower right region of the GA, respectively. However, exemplary embodiments of the present disclosure are not limited thereto, and may refer to regions divided from the GA into quadrants to have the same size. Each of the LF receive sensors (or, antennas) 220 may be a three-axis LF receive sensor (or, antenna).

A controller 110 of the VA 100 and a controller 210 of the GA 200 may be configured to exchange information based on communication between them. The controller 110 of the VA may be configured to reduce an output strength of the transmit antennas based on the extent to which the vehicle is close to the charging pad. In other words, based on the distance between the vehicle and the charging pad. More specifically, the controller 110 of the vehicle may be configured to transmit information regarding an estimated vehicle position trajectory to the controller 110 of the transmission pad. The estimated vehicle position trajectory may be calculated using a numerical analysis model of the vehicle based on information obtained from at least one sensor mounted on the vehicle such as a gyro sensor or a wheel speed sensor.

The controller 210 of the GA having received the information regarding the estimated vehicle position trajectory may be configured to derive a speed of the vehicle approaching the LF receive sensors (or, antennas) from the information regarding the estimated position trajectory received from the vehicle. The controller 210 of the GA may be configured to compare the estimated position trajectory received from the vehicle and a vehicle position trajectory derived using the LF receive sensors (or, antennas) to calculate an acceleration flag, that is, a flag indicating acceleration or decrease of the vehicle by using (+) or (−). Then, the controller 210 of the GA may be configured to transmit the acceleration flag and the vehicle position trajectory measured using the LF receive sensors (or, antennas) to the controller 110 of the VA.

In particular, the controller 110 of the vehicle may be configured to determine the strength of the transmit antennas based on a current vehicle position trajectory, a distance measured by the LF receive sensors (or, antennas), which is received from the GA, and the (+/−) acceleration flag. The current vehicle position trajectory may be calculated based on a vehicle model and using disturbance factors such as a steering angle and a yaw rate, that is, information collected from at least one sensor.

The controller 110 of the VA may be configured to reduce the strength of the transmit antennas linearly based on the distance measured by the LF receive sensors (or, antennas). The controller 110 of the VA may also be configured to increase the amount of decreasing the strength of the transmit antennas in proportion to the magnitude of the acceleration flag when the acceleration flag has a positive value. On the other hand, when the acceleration flag has a negative value, the controller 110 of the VA may be configured to minimally reduce the strength of the transmit antennas in inverse proportion to the magnitude of the acceleration flag.

The present disclosure may use the GA and the VA as shown in FIG. 5 to suppress the saturation of the LF receive sensors (or, antennas), thereby enabling measurement of the position of the vehicle even when the vehicle approaches the transmission pad.

Figure 6:
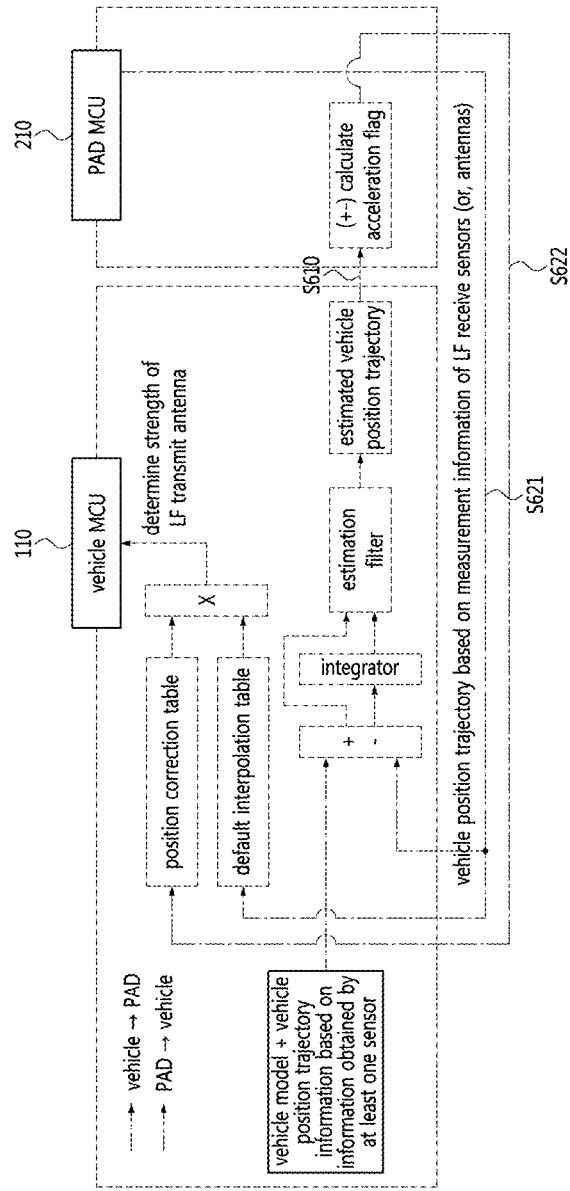
FIG. 6 is a detailed conceptual diagram illustrating a position estimation method according to an exemplary embodiment of the present disclosure.

FIG. 6 is a detailed conceptual diagram illustrating a position estimation method according to an exemplary embodiment of the present disclosure. Since the position estimation methods according to the present disclosure are mainly performed by the controller of the VA and the controller of the GA, operations of each of the entities and operations performed between the entities will be described mainly in FIG. 6.

As shown in FIG. 6, the controller 110 of the VA may be configured to estimate a vehicle position trajectory based on at least one of information regarding a vehicle model and information collected from at least one sensor, and provide information regarding the estimated position trajectory to the controller 210 of the GA. The controller 210 of the GA may be configured to provide the VA with information regarding a vehicle position trajectory measured by the LF receive sensors (or, antennas) (S621).

The controller 210 of the GA may be configured to compare a distance (hereinafter, referred to as an 'estimated distance') from the transmission pad to the vehicle, which is calculated from the estimated position of the vehicle, and a distance (hereinafter, referred to as a 'measured distance') from the transmission pad to the vehicle, which is measured by the LF receive sensors (or, antennas), generate an acceleration flag based on a difference between the two distances, and transmit the acceleration flag to the vehicle (S622).

Particularly, when the estimated distance is greater than the measured distance, it means that the vehicle is accelerating. The controller 210 of the GA may be configured to generate the acceleration flag having a positive (+) value. In the opposite case, the acceleration flag having a negative (−) value may be generated. The reason for using the estimated vehicle position trajectory is that the estimating vehicle itself cannot determine the moving distance of the vehicle. Therefore, in an exemplary embodiment of the present disclosure, the vehicle may be configured to estimate (or, predict) the position of the vehicle, to which the vehicle will move, by using an estimation filter.

The controller of the VA may be configured to determine the strength of the transmit antennas according to the value of the acceleration flag received from the GA. In particular, the vehicle may be configured to determine the strength of the LF transmit antennas according to a position of the vehicle using a default interpolation table. The default interpolation table may be derived through an experimental scheme. For example, the acceleration flag may have 5 positive levels and 5 negative levels (e.g., values of −5, −4, −3, −2, −1, 1, 2, 3, 4, and 5). To apply a weight value to the acceleration flag, a position correction table (e.g., a table having values of 0.5, 0.6, 0.7, . . . , 1.5) may be used.

When the acceleration flag to which the weight value is applied is multiplied by the estimated position value of the vehicle, it may be an input to the default interpolation table. The calculation result using the position correction table and the default interpolation table may ultimately determine the strength of the LF transmit antennas.

Meanwhile, the VA may act as a position measurement apparatus according to an exemplary embodiment of the present disclosure. The position measurement apparatus may include at least one processor and a memory configured to store at least one instruction executable by the at least one processor. The processor may execute the at least one instruction stored in the memory, and may be a central processing unit (CPU), a graphics processing unit (GPU), or a dedicated processor in which methods according to the present disclosure are executed. The memory may be configured as a volatile storage medium and/or a nonvolatile storage medium, and may be configured as a read only memory (ROM) and/or a random access memory (RAM).

Particularly, the at least one instruction may be configured to transmit LF signals to initiate alignment with the GA; estimate a position of the vehicle using at least one sensor mounted on the vehicle; provide information regarding the estimated position of the vehicle to the GA; receive information regarding a position of the vehicle measured by LF receive antennas of the GA and an acceleration flag calculated by the GA; and adjust a transmission strength of the LF signals transmitted by the VA based on the information regarding the position of the vehicle measured by the LF receive antennas and the acceleration flag.

Figure 7:
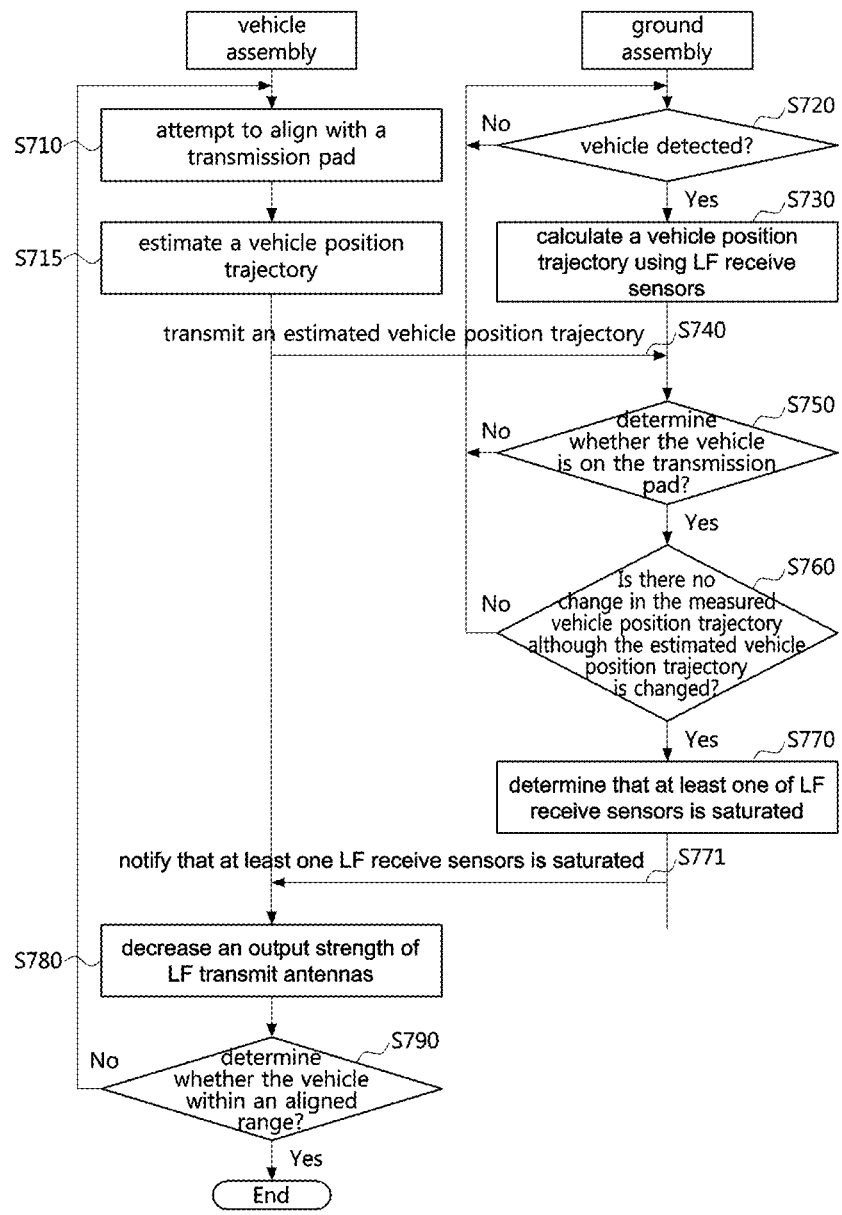
FIG. 7 is an operation flowchart illustrating a position estimation method according to an exemplary embodiment of the present disclosure.

FIG. 7 is an operation flowchart illustrating a position estimation method according to an exemplary embodiment of the present disclosure. The method described herein below may be executed by a controller specifically programed to execute the process. The position estimation method illustrated in FIG. 7 is an exemplary embodiment illustrating operations between a VA and a GA over time.

As shown in FIG. 7, as a vehicle enters a parking lot and attempts to align the position with a transmission pad (S710), LF receive antennas of the GA may be configured to detect linkage fluxes. When the vehicle is detected (S720), a controller of the GA may be configured to calculate a vehicle position trajectory based on coordinate values measured by the LF receive antennas (S730).

On the other hand, when attempting to align the position with the transmission pad, the VA may be configured to calculate an estimated vehicle position trajectory and transmit the trajectory to the GA (S740). To calculate the estimated vehicle position trajectory, at least one sensor mounted on the vehicle (e.g., wheel speed sensor, yaw rate sensor, etc.) and a numerical vehicle model (e.g., a model having 7 degrees of freedom) may be used.

In exemplary embodiments of the present disclosure, it may be assumed that a driver continuously attempts aligning the vehicle with the transmission pad and saturation of the LF receive antennas proceeds when the vehicle is located on the transmission pad. This assumption may be verified by saturation characteristics according to the size of the transmission pad and the distance from the transmission pad to the LF receive antennas. If this assumption is not established, the sensitivity characteristics of the LF receive antennas are determined to be insufficient, and thus, a redesign of the LF receive antennas will be required.

As shown in FIG. 7, the GA may be configured to determine whether the vehicle is located on the transmission pad (S750). When the vehicle is located on the transmission pad, whether the vehicle position trajectory measured using the LF receive antennas remains unchanged may be determined despite the estimated vehicle position trajectory changes (S760). As a result of the determination, when there is no change in the vehicle position trajectory measured using the LF receive antennas although the estimated vehicle position trajectory along which the vehicle actually moves is continuously changed, it may be determined that at least one of the LF receive sensors (or, antennas) is saturated (S770), and the GA may be configured to provide a notification to the vehicle that at least one of the LF receive sensors (or, antennas) is saturated.

In exemplary embodiments of the present disclosure, as the vehicle attempts to align the position, whether at least one the LF receive sensors (or, antennas) is saturated may be monitored from a moment when the transmission pad detects the vehicle. In other words, in exemplary embodiments of the present disclosure, the vehicle may be configured to monitor whether at least one of the LF receive sensors (or, antennas) is saturated while attempting to align the position from the moment when the transmission pad detects the vehicle.

When the vehicle is located on the transmission pad and the saturation of at least one of the LF receive sensors (or antennas) is simultaneously recognized, the vehicle may be configured to reduce the output strength of the transmit antennas until a change is detected in the distance measured by the LF receive antennas (S780). In other words, the VA may be configured to decrease the output strength of the LF transmit antennas until the difference between the estimated positon trajectory of the vehicle calculated by the controller (or MCU) of the vehicle and the position trajectory of the vehicle measured using the LF receive antennas is within a predetermined range. When the vehicle is located within an aligned range of the transmission pad, the position alignment may be completed (i.e., 'YES' in S790).

FIG. 8 is a conceptual diagram for explaining a position estimation method according to an exemplary embodiment of the present disclosure. As shown in FIG. 8, a position trajectory of the vehicle may be calculated using left/right wheel speed sensors of front wheels and rear wheels and a yaw rate sensor mounted to an electronic stability control (ESC) apparatus.

In FIG. 8, a wheel speed may refer to an average of speeds of four wheels, and a distance between the vehicle and the GA may refer to a distance traveled by the vehicle during one sampling time. A yaw rate offset may be applied to the yaw rate to prevent divergence during integration. The yaw rate may be multiplied by one sampling time to get a heading degree of the vehicle for the one sampling time. If the yaw rate exceeds a yaw rate limit value, since the heading degree is unable to be calculated, the heading degree may be initialized to '0'.

In an exemplary embodiment of the present disclosure, an equation for obtaining an updated yaw rate is also applied to obtain the moving trajectory of the vehicle for one sampling time, and by integrating this value, the moving trajectory of the vehicle may be finally obtained. On the other hand, the position estimation method described with reference to FIG. 8 is merely one exemplary embodiment, and an estimation filter for estimating a longitudinal velocity and a lateral velocity in a seven degree of freedom vehicle model may be used.

Particularly, the seven degrees of freedom may include, as main parameters, the longitudinal velocity, the lateral velocity, the yaw rate, the wheel speeds of the front and rear wheels, the vertical displacement for the sprung mass of the vehicle, and the pitch angle of the body of the vehicle. In another exemplary embodiment of the present disclosure, to calculate a position trajectory of a low-speed traveling vehicle, the position trajectory of the vehicle may be estimated using a method of considering 7 degrees of freedom along with information obtained by a least one sensor mounted on the vehicle.

FIG. 9 is a graph illustrating a movement trajectory of a vehicle according to an exemplary embodiment of the present disclosure. FIG. 9 illustrates a movement trajectory of the vehicle moving for a predetermined time, which is obtained by inputting actual measurement data of yaw rate and wheel speed into the equation shown in FIG. 8.

Figure 10A:
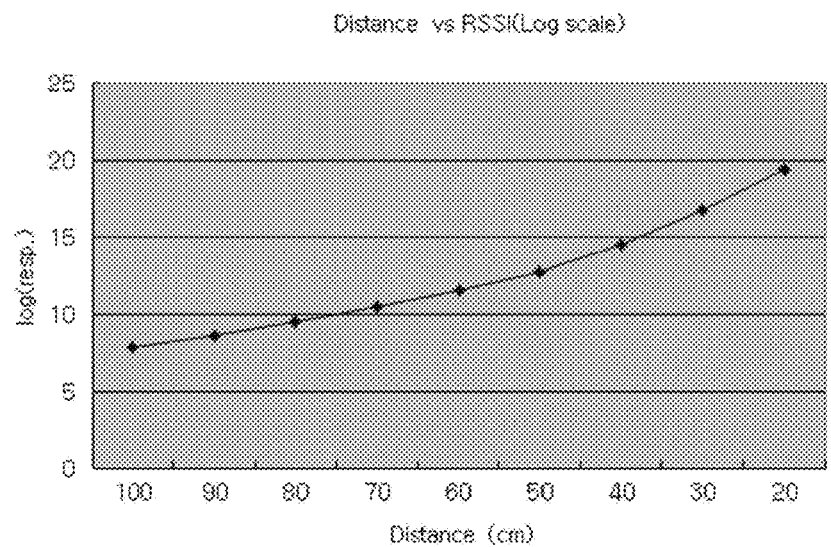
FIG. 10A is a graph illustrating Received Signal Strength Indicator (RSSI) measurement values according to a distance between an LF transmit antenna and an LF receive antenna according to an exemplary embodiment of the present disclosure.

FIG. 10A is a graph illustrating Received Signal Strength Indicator (RSSI) measurement values according to a distance between an LF transmit antenna and an LF receive antenna according to an exemplary embodiment of the present disclosure. As shown in FIG. 10A, the distance between the vehicle and the transmission pad is closer, the RSSI value of the LF signal measured by the transmission pad increases. From this, if the maximum LF transmission strength for detecting the maximum distance is fixed, saturation of the LF receive antenna may proceed at a short distance.

Figure 10B:
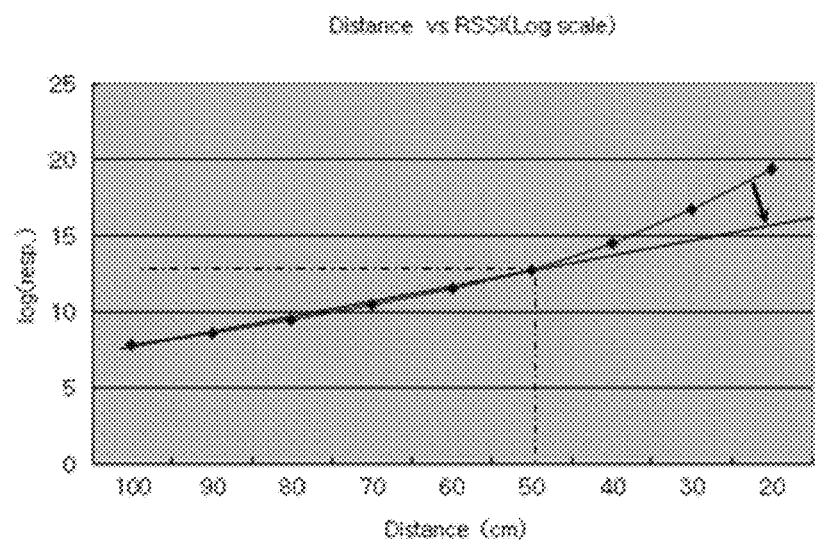
FIG. 10B is a graph illustrating linearized RSSI measurement values according to a distance between an LF transmit antenna and an LF receive antenna according to an exemplary embodiment of the present disclosure.

FIG. 10B is a graph illustrating linearized RSSI measurement values according to a distance between an LF transmit antenna and an LF receive antenna according to an exemplary embodiment of the present disclosure. As shown in FIG. 10B, since the RSSI measurement values have a non-linear characteristic according to the distance, to use the RSSI value as a distance value with a ratio of 1:1, the strength of the LF transmit antenna may be adjusted so that the RSSI values have a linear characteristic in the entire distance range. Accordingly, as shown in FIG. 10B, the transmission strength in the saturation range may be determined such that a slope value of the RSSI to the distance becomes a slope value within about 50 [cm], which is a linear range.

Accordingly, the values of the output strength of the LF transmit antenna determined in the entire distance range may be the values of the default interpolation table described through the above exemplary embodiment.

While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may operate in conjunction with a microprocessor to perform one of the methods described herein. Generally, the methods are preferably performed by some hardware device.

While the exemplary embodiments of the present disclosure and their advantages have been described in detail, it should be understood that various changes, substitutions, and alterations may be made herein without departing from the scope of the present disclosure.

What is claimed is:

1. A method for measuring a position, performed by a vehicle assembly (VA) for alignment between a ground assembly (GA) and the VA, the method comprising:
    transmitting, by a controller, low frequency (LF) signals to initiate alignment with the GA;
    estimating, by the controller, a position of a vehicle using at least one sensor mounted on the vehicle;
    providing, by the controller, information regarding the estimated position of the vehicle to the GA;
    receiving, by the controller, information regarding a position of the vehicle measured by LF receive antennas of the GA and an acceleration flag calculated by the GA; and
    adjusting, by the controller, a transmission strength of the LF signals transmitted by the VA based on the information regarding the position of the vehicle measured by the LF receive antennas and the acceleration flag.

2. The method according to claim 1, wherein the adjusting of the transmission strength includes:
    in response to a notification from the GA that at least one of the LF receive antennas is saturated, reducing, by the controller, the transmit strength of the LF signals until a change is detected in the position of the vehicle measured by the LF receive antennas.

3. The method according to claim 1, wherein the acceleration flag is calculated by comparing the estimated position of the vehicle and the measured position of the vehicle.

4. The method according to claim 1, wherein the adjusting of the transmission strength includes:
    linearly decreasing, by the controller, the transmission strength of the LF signals as a distance between the VA and the GA, which is derived from the position measured by the LF receive antennas, decreases.

5. The method according to claim 4, wherein the linearly decreasing of the transmission strength includes:
    in response to determining that the acceleration flag has a positive value, reducing, by the controller, the transmission strength of the LF signals in proportion to a magnitude of the acceleration flag; and
    in response to determining that the acceleration flag has a negative value, reducing, by the controller, the transmission strength of the LF signals in inverse proportion to the magnitude of the acceleration flag.

6. The method according to claim 1, wherein the adjusting of the transmission strength includes:
    determining, by the controller, the transmission strength of the LF signals using a default interpolation table derived by linearizing signal strengths for respective distances measured by the LF receive antennas and a position correction table derived based on the acceleration flag.

7. The method according to claim 1, wherein the at least one sensor mounted on the vehicle includes at least one of a wheel speed sensor and a yaw rate sensor, and the estimated position of the vehicle is calculated based on a wheel speed and a yaw rate.

8. An apparatus for measuring a position of a vehicle for alignment between a ground assembly (GA) and a vehicle assembly (VA), the apparatus including at least one low frequency (LF) transmit antenna, a processor, and a memory storing at least one instruction executable by the processor, wherein the at least one instruction is configured to:
    transmit LF signals to initiate alignment with the GA;
    estimate a position of the vehicle using at least one sensor mounted on the vehicle;
    provide information regarding the estimated position of the vehicle to the GA;
    receive information regarding a position of the vehicle measured by LF receive antennas of the GA and an acceleration flag calculated by the GA; and
    adjust a transmission strength of the LF signals transmitted by the VA based on the information regarding the position of the vehicle measured by the LF receive antennas and the acceleration flag.

9. The apparatus according to claim 8, wherein in the adjusting of the transmission strength the at least one instruction is further configured to, in response to the GA outputting a notification that at least one of the LF receive antennas is saturated, reduce the transmit strength of the LF signals until a change is detected in the position of the vehicle measured by the LF receive antennas.

10. The apparatus according to claim 8, wherein the acceleration flag is calculated by comparing the estimated position of the vehicle and the measured position of the vehicle.

11. The apparatus according to claim 8, wherein in the adjusting of the transmission strength the at least one instruction is further configured to:
  linearly decrease the transmission strength of the LF signals as a distance between the VA and the GA, which is derived from the position measured by the LF receive antennas, decreases.

12. The apparatus according to claim 11, wherein in the linearly decreasing of the transmission strength the at least one instruction is further configured to:
  in response to determining that the acceleration flag has a positive value, reduce the transmission strength of the LF signals in proportion to a magnitude of the acceleration flag; and
  in response to determining that the acceleration flag has a negative value, reduce the transmission strength of the LF signals in inverse proportion to the magnitude of the acceleration flag.

13. The apparatus according to claim 8, wherein in the adjusting of the transmission strength the at least one instruction is further configured to:
  determine the transmission strength of the LF signals using a default interpolation table derived by linearizing signal strengths for respective distances measured by the LF receive antennas and a position correction table derived based on the acceleration flag.

14. The apparatus according to claim 8, wherein the at least one sensor mounted on the vehicle includes at least one of a wheel speed sensor and a yaw rate sensor, and the estimated position of the vehicle is calculated based on a wheel speed and a yaw rate.

* * * * *